(12) United States Patent
Jakins et al.

(10) Patent No.: US 9,099,892 B2
(45) Date of Patent: Aug. 4, 2015

(54) PORTABLE POWER SYSTEMS

(75) Inventors: Glenn Jared Jakins, Provo, UT (US); Peter J. Ransom, Provo, UT (US)

(73) Assignee: HUMLESS, LLC, Lindon, UT (US)

( * ) Notice: Subject to any disclaimer, the term of this patent is extended or adjusted under 35 U.S.C. 154(b) by 434 days.

(21) Appl. No.: 13/433,286

(22) Filed: Mar. 28, 2012

(65) Prior Publication Data

US 2013/0257346 A1 Oct. 3, 2013

(51) Int. Cl.
*H02J 7/00* (2006.01)
*H02J 7/35* (2006.01)

(52) U.S. Cl.
CPC .............. *H02J 7/355* (2013.01); *H02J 7/0044* (2013.01)

(58) Field of Classification Search
CPC ...... Y02E 60/12; H02J 7/0042; H02J 7/0045; H01M 10/46; H01M 10/44
USPC .......................................................... 320/107
See application file for complete search history.

(56) References Cited

U.S. PATENT DOCUMENTS

| | | | |
|---|---|---|---|
| 6,075,580 A * | 6/2000 | Kouchi | 349/110 |
| 6,140,798 A | 10/2000 | Krieger | |
| 6,311,279 B1 | 10/2001 | Nguyen | |
| 6,344,301 B1 * | 2/2002 | Akutsu et al. | 430/7 |
| 6,417,828 B1 * | 7/2002 | Sato et al. | 345/89 |
| 6,771,328 B2 * | 8/2004 | Park et al. | 349/42 |
| 6,791,648 B2 * | 9/2004 | Tanaka et al. | 349/129 |
| 7,272,464 B1 | 9/2007 | Jurewicz, Jr. | |
| 7,839,019 B2 | 11/2010 | Chang | |
| 2004/0018656 A1 * | 1/2004 | Tsai | 438/42 |
| 2004/0070708 A1 * | 4/2004 | Kurashina | 349/110 |
| 2004/0084672 A1 * | 5/2004 | Tanaka et al. | 257/52 |
| 2004/0169460 A1 * | 9/2004 | Chang et al. | 313/498 |
| 2004/0179159 A1 * | 9/2004 | Tanaka et al. | 349/123 |
| 2004/0217701 A1 * | 11/2004 | Kato et al. | 313/506 |
| 2004/0232420 A1 * | 11/2004 | Lee et al. | 257/59 |
| 2005/0117343 A1 | 6/2005 | Leifer | |
| 2005/0257827 A1 | 11/2005 | Gaudiana | |
| 2005/0269986 A1 * | 12/2005 | Peng | 320/107 |
| 2006/0032076 A1 * | 2/2006 | Evanyk et al. | 34/96 |
| 2007/0024236 A1 * | 2/2007 | Arakelian | 320/107 |
| 2007/0184339 A1 | 8/2007 | Scheucher | |
| 2007/0250725 A1 | 10/2007 | Chia | |
| 2008/0231119 A1 | 9/2008 | Yeh | |
| 2009/0133733 A1 | 5/2009 | Retti | |
| 2010/0038974 A1 | 2/2010 | Imperial | |
| 2011/0037428 A1 * | 2/2011 | Sakaguchi et al. | 320/107 |
| 2011/0260538 A1 | 10/2011 | Huang | |
| 2013/0257346 A1 * | 10/2013 | Jakins et al. | 320/107 |

* cited by examiner

*Primary Examiner* — Arun Williams
(74) *Attorney, Agent, or Firm* — Jeffery M. Lillywhite, PC

(57) ABSTRACT

A power system includes an electric battery and an enclosure configured to surround the electric battery. A console is disposed on at least one side of the enclosure. The console includes a first charge input configured to receive a charge from an AC power source, a second charge input configured to receive a charge from a DC power source, and an outlet configured to receive a connector for a device. A battery management system includes controls to regulate a battery charge between the first charge input and the second charge input.

20 Claims, 10 Drawing Sheets

PORTABLE POWER SYSTEMS

CROSS-REFERENCE TO RELATED APPLICATIONS

Not applicable.

BACKGROUND OF THE INVENTION

1. The Field of the Invention

The present disclosure generally relates to power systems and, more particularly, to quiet portable power systems.

2. The Relevant Technology

A dual power source automatic switch circuit and an isolation apparatus are discussed in U.S. Patent Publication No. 2011/0260538. The automatic switch circuit includes a main power source circuit and a backup power source circuit. The main and backup power source circuits include manual switches installed in a manual switch zone and isolated by a sub-isolation board. The main switch includes elements coupled in series. The backup power source circuit includes a backup switch with multiple elements coupled in parallel. The power source includes a power monitor module to monitor abnormal conditions of the main and backup power source circuits, and control the switch elements to perform power supply transfer.

U.S. Pat. No. 7,272,464 discusses a mobile computer aided design apparatus. The apparatus includes a vehicle having a computer aided design workstation. The workstation is coupled to a router with wireless communication transceivers. An uninterruptible power supply is coupled to the computer aided design work station, the router, and to the engine. A cut-off switch is coupled between an inverter and a second battery.

A portable power storage and supply system having an AC charger and a DC charger is discussed in U.S. Pat. No. 7,839,019. The AC and DC charging and discharging can be carried at one time. The system includes an inverter, battery modules and controllers. DC charging can include energy from a renewable energy source. The battery modules are separable from the system for providing DC energy for energizing automotive battery jumper cables or for energizing DC powered devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

In one aspect of the invention, a power system includes an electric battery and an enclosure configured to surround the electric battery. A console is disposed on at least one side of the enclosure. The console includes a first charge input configured to receive a charge from an AC power source, a second charge input configured to receive a charge from a DC power source, and outlets for AC and DC devices. A battery management system includes controls to regulate a battery charge between the first charge input and the second charge input.

In another aspect of the invention, a power system includes an electric battery and an enclosure configured to surround the electric battery. A console is disposed on at least one side of the enclosure. The console includes a first charge input configured to receive a charge from an AC power source, a second charge input configured to receive a charge from a DC power source, and an outlet configured to receive a connector for a device. A battery management system includes controls to allow a battery charge from the first charge input and the second charge input simultaneously.

In a further aspect of the invention, a power system includes an electric battery and an enclosure configured to surround the electric battery. A console is disposed on at least one side of the enclosure. The console includes a first charge input configured to receive a charge from an AC power source, a second charge input configured to receive a charge from a DC power source, and an outlet configured to receive a connector for a device. A master isolation switch is connected to the battery. The master isolation switch is positioned to disconnect the battery from the outputs and charge inputs of the system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE VARIOUS EMBODIMENTS

The present systems and methods include various embodiments of a portable power system. The portable emergency energy storage device includes multiple charging inputs and power outputs. It has AC and DC charging inputs, such as 120V and 12V respectively. The charging inputs can be capable of charging the power system using a 12V or 24 VDC nominal renewable energy sources, e.g., solar, wind, hydroturbine, manual generators and the like. The power system can be adapted to accept charges from renewable power sources (e.g., solar panels, wind turbines and other known power sources) and can use lithium-ion battery technology, such as lithium iron phosphorous oxide. The power outputs can include, for example, one or more of 120 VAC, 220 VAC, 5 VDC, 12 VDC or 24 VDC that may be connected through a USB interface.

The power system can be a complete stand-alone long term energy storage system. It includes a battery, battery control module, isolation switch, inverter, diode(s), battery state of charge indicator and integrated AC charger. The system can have the ability to store power for extended periods. The internal battery system can be charged through AC or DC sources, including, inter alia, alternative energy, and simultaneously capable of providing power to devices in the form of AC, 12 VDC, 24 VDC and 5V USB and the like. The user interface can use common and/or universal sockets and connectors to make the device compatible with existing AC appliances and DC alternative energy sources.

Figure 1:
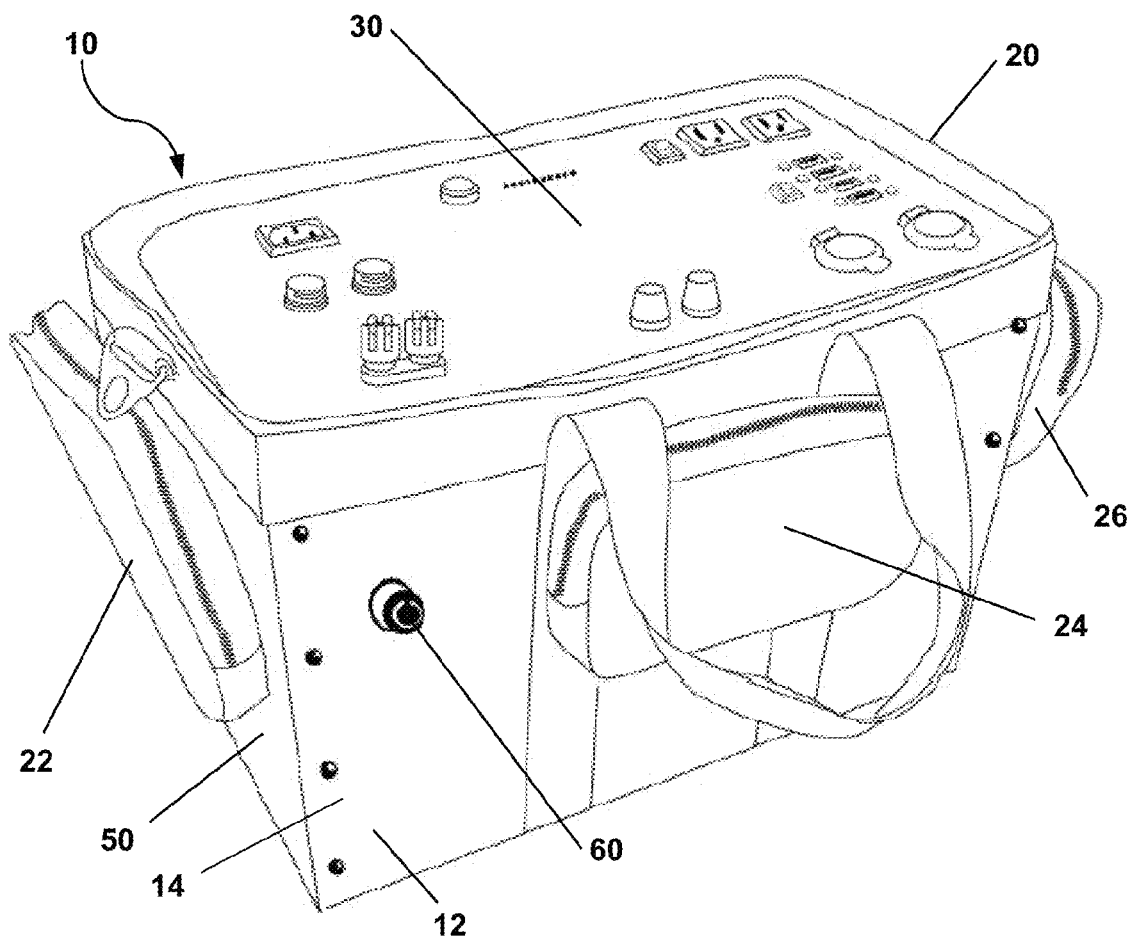
FIG. 1 illustrates a power system in accordance with the various embodiments on the invention.

The power system can be an all-in-one device that is adapted to be versatile, portable and readily applicable for a wide variety of applications. The design of the power system is illustrated in FIG. 1. The power system 10 includes an electric battery 12 in an enclosure 14. The system can also include carrying bag 20, which can be designed to tote around the power system 10. The carrying bag 20 can be attached to the power system 10 as an integral part or as a separate piece. The bag 20 can have a cover to fully enclose the power system 20. The cover may be closed over the top of the power system 10 using an attachment such as snaps, zipper, hook and loop fasteners, and the like.

The carrying bag 20 can include removable storage pouches 22, 24, 26. The removable pouches 22, 24, 26 can be attached to the carrying bag 20 permanently, for example, with an adhesive, stitching, and the like or a detachable fastener, such as hook and loop fasteners, snaps, zippers, and the like. The pouches may be used to store items associated with the power system, for instance, cables, cords and other accessories.

A console 30 is provided on a side of the enclosure 14, such as the top, that includes connectors and switches to charge the power system and draw power from the system. The console includes a variety of connectors to adapt AC and DC charging from multiple sources. Other connectors allow multiple accessories to be plugged into the system for a power source. The switches and connectors are discussed in more detail below with respect to FIG. 2. The cover can be used to protect the switches and connectors when not in use.

The power system can include ventilation areas in the enclosure 14 or case. A ventilation area 50, for example, can be placed on a side of the enclosure 14 of the power system 10. The ventilation area 50 provides a vent or multiple vents to allow air to circulate through the system 10. The air can circulate through natural air flow or by forced air, such as a fan or the like. Ventilation areas, for example, can be placed on opposing sides and towards the bottom of the case. A fan and ventilation area, for instance, may also be placed on the front and back of the case. The ventilation area 50 may also be associated with a heat recovery ventilation system, a heat exchanger, air conditioning system, filter system, or the like to maintain a preferred temperature range. The preferred temperature range, for instance, may be between about 40° F. and about 130° F.

The power system 10 may also include a master key 60, a master isolation switch or switch as illustrated in FIG. 1. The master key 60 provides a power connect or disconnect to the power system 10. The master key 60 can be selected between an "on" or "off" position, for example, using a push button, a toggle switch, a keyed switch, and the like. To turn on the power system on, for instance, the user inserts a master key into a switch while pushing in gently, the key is then turned clockwise 90 degrees to the on position. The master key 60 can also be used to turn off the power system 10 by switching it to an off position, for example, by rotating the key in a counterclockwise rotation. The user can switch the power system 10 off during transportation, storage, or to prevent unwanted tampering or use by turning the master key 60 to the off position and removing the key.

The master key 60 or master isolation switch allows for long term energy storage utilizing lithium-based batteries with continuous battery monitoring by isolating the circuits and parasitic loads in the system while maintaining active operation of the battery control module. Lithium based batteries generally need a battery control or protection module for safe operation and long battery life, and do not require a trickle charge. The master key 60 can provide a safety mechanism during transport by isolating all charging and load circuits from the internal battery, preventing the possibility of an internal short circuit during rough handling or transport. The master key 60 and battery control module 30 configuration can allow the user to "switch off" all inputs and outputs with a single switch without disabling the necessary battery control module, giving the user a positive confirmation that the system is disabled and ready for long term storage.

Figure 2:
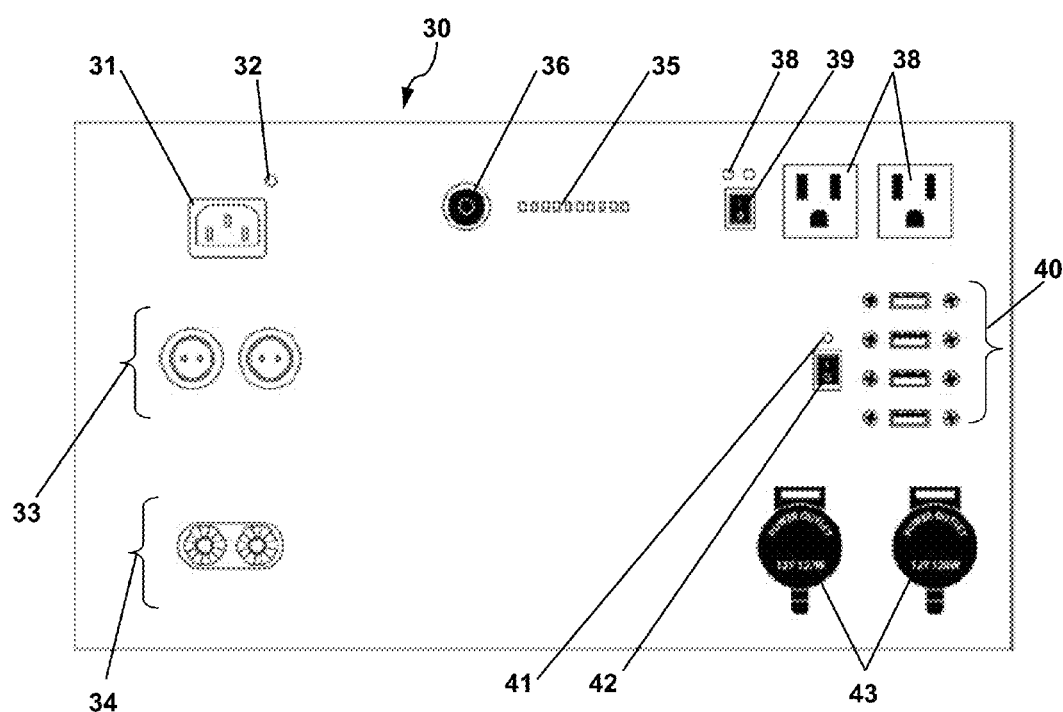
FIG. 2 illustrates a top view of a console for the power system in accordance with the present invention.

A detailed top view of the console 30 is illustrated in FIG. 2. The console 30 includes a charge input 31 to connect a power source to the system 10 and input a charge. The charge input 31 can be used, for example, to connect a wall charging cord to the power system 10. The user can insert a charging cord into the charge input 31 to plug the power system 10 into an AC power source, such as a wall socket in a home, an office or other power source socket to charge the power system 10. The charge input 31 can include an indicator light 32. The indicator light 32, for example, can be an LED light that appears red while the unit is charging and then turns green when the charge is complete. The charger may be programmed to automatically switch off when the charge is complete. Each charge input is adapted to accept an AC charge or a DC charge. The AC source, for example, can be 100/220 VAC, while a separate input can be adapted to accept a low voltage DC power source, such as 14.6V.

The console 30 can also include a set of charge inputs 33 and 34. The charge inputs 33 and 34 can have connectors adapted to receive a plug for a DC charge. The user, for example, can attach a DC power source, such as a solar panel, car charging cord, or other DC charging sources with plugs that can be connected directly to the connectors or connected using an adaptor. The indicator light 32 can be connected to the charge inputs 33 and 34 in a similar manner as charge input 31. The indicator light 32, may glow red when a charging source is connected. Charging inputs 33 and 34 have connectors to accept charging from DC devices and 100-240 VAC mains power.

A charge status indicator 35 or battery state of charge indicator can be provided on the console 30. The charge status indicator 35 can include a push button 36 to check battery charge state. The user can press the push button 36 to actuate the charge status indicator 35 and obtain a reading on the charge of the power source 10. The charge indicator, for instance, will illuminate all the lights to show a full charge. As the charge is depleted, the fewer indicator lights will remain lit. No indicator lights will be lit when the power source is depleted. The indicator 35 includes a set of lights that are lit according to the percentage of the charge depleted. The more charge remaining in the system, the more lights that will be lit.

The system 10 also includes outlets to supply power to external devices. At least one 120 VAC outlet 37 can be provided in the control panel 30. AC devices can be plugged into the 120 VAC outlet 37 or outlets. An operation light indicator 38 can be provided to indicate whether the plugs are operable. The operation light indicator 38, for example, can include a green LED to indicate a normal operation and a red LED to indicate a fault, short, low battery, overload, or the like. A toggle switch 39 can be provided to turn the 120 VAC outlets 37 on or off or switch the outlets between a use and non-use position. When the red indicator is lit, the user may switch off the system with the toggle switch 39 and turn the system back on to reset it after a fault. Each of the 120 VAC outlets can have, for instance, a maximum 1000 W output.

A set of USB outlets 40 can also be provided in the system 10. Devices such as a cell phone, tablet, gaming device and the like can be plugged into the USB outlets 40. Each of the USB outlets 40 can be, for example, 5V 1 A/2.1 A max output. An indicator light 41 can be provided to show that the USB outlets are operable. The indicator light 41, for example, can be an LED light to indicate a normal operation. A toggle switch 42 can be provided to turn the USB outlets 42 on or off or switch the USB outlets between a use and non-use position.

The system 10 can also include a set of 12 VDC outlets 43 in the control panel 30. The user may plug in 12 VDC devices into the 12 VDC outlets 43. The 12 VDC outlets function similar to a DC outlet in a vehicle.

The system 10 is a portable emergency energy storage device with multiple charging inputs and power outputs. The control panel 30 may have AC and DC charging inputs, such as 120V and 12V respectively, including the capability to charge with 12V nominal renewable energy sources (solar, wind, hydroturbine, manual generators and the like). The charging system includes the ability to optimize the power input from alternative energy as well as AC charging to maximize the use of alternative energy available while charging from both sources simultaneously. Power outputs can include 120 or 220 VAC, 12 VDC and/or 24 VDC and 5 VDC via USB interface.

The system is a complete stand-alone, long term energy storage device that can include a portable enclosure with user interface, battery, battery control module, master isolation switch, DC to AC power inverter circuit, AC to DC battery charging circuit, battery state of charge indicator and DC charge control circuit with means to maximize the usage of DC or alternative energy while charging with AC and DC, simultaneously. The system has the ability to store power for extended periods through its internal battery system, is capable of being charged through AC and DC sources, including alternative energy, and simultaneously capable of providing power to devices in the form of AC, 12 VDC and 5V USB. DC and AC charging are regulated when used to charge simultaneously for maximum utilization of alternative energy.

The power system 10 can include a portable enclosure with a user interface and a battery pack with battery control module. The circuits for the system include a DC to AC power inverter circuit, an AC to DC charging circuit and a DC charge control circuit.

Figure 3:
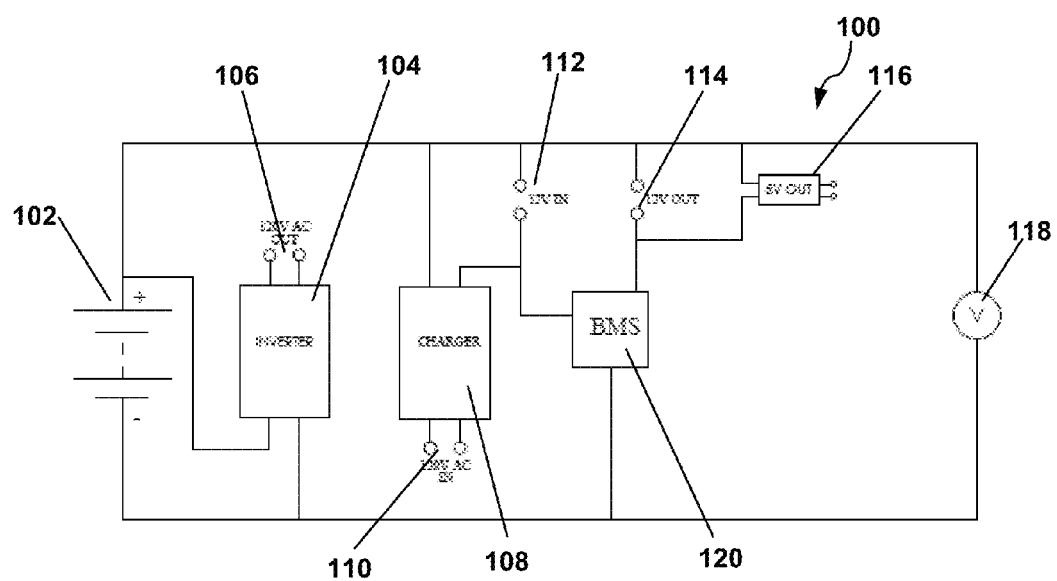
FIG. 3 illustrates a circuit diagram of an embodiment of the power system.

A circuit diagram of an embodiment of a power system 100 is illustrated in FIG. 3. The power system 100 includes a power source 102, such as a battery, connected to an inverter 104. The inverter 104 is connected to a 120 VAC outlet 106, such as a connector. The system 100 can also include a charger 108. The charger 108 includes a 120 VAC input 110, for example, a charge input. A 12V input 112 can be connected in parallel to the charger 108. A 12V output 114 can also be connected to the power system 100. A 5V output 116 can be connected in parallel to the 12V output 114. A voltmeter 118 is connected to the system 100 to measure electrical potential difference across the circuit. The power system 100 includes a battery management system 120 to control the AC and DC input and the power output across the connectors.

Figures 4A, 4B:
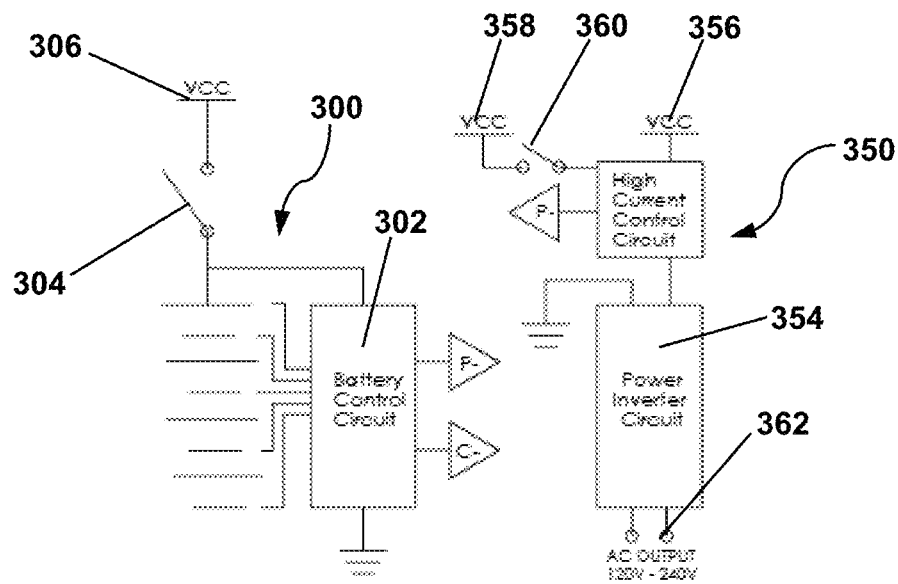
FIGS. 4A-4E illustrate detailed diagrams of various circuits in the power system.

Details of components in the circuitry are illustrated in FIGS. 4A-E. A circuit 300 including a battery control circuit 302 is shown in FIG. 4A. The battery control circuit 302 includes a switch 304 to disconnect the battery control circuit 302 from charge and discharge circuits Vcc 306.

FIG. 4B illustrates details of circuitry 350 including a high current control circuit 352 and a power inverter circuit 354. The high current control circuit 352 is connected to a battery at connection points 356 and 358. The battery may be disconnected at connection point 358 using a switch 360. When switch 360 is activated, the circuitry 350 powers on the power inverter circuit 354. The high current control circuit 352 is also connected to the power inverter circuit 354. The power inverter circuit 354 is connected to an AC output 362. The DC to AC power inverter circuit converts the 12/24/48 VDC stored in the battery to 100/110/220/240 VAC that the user can use to power an AC device. The circuit can produce a Sine Wave AC waveform or a Modified Sine-wave AC waveform.

Figures 4C, 4D, 4E:
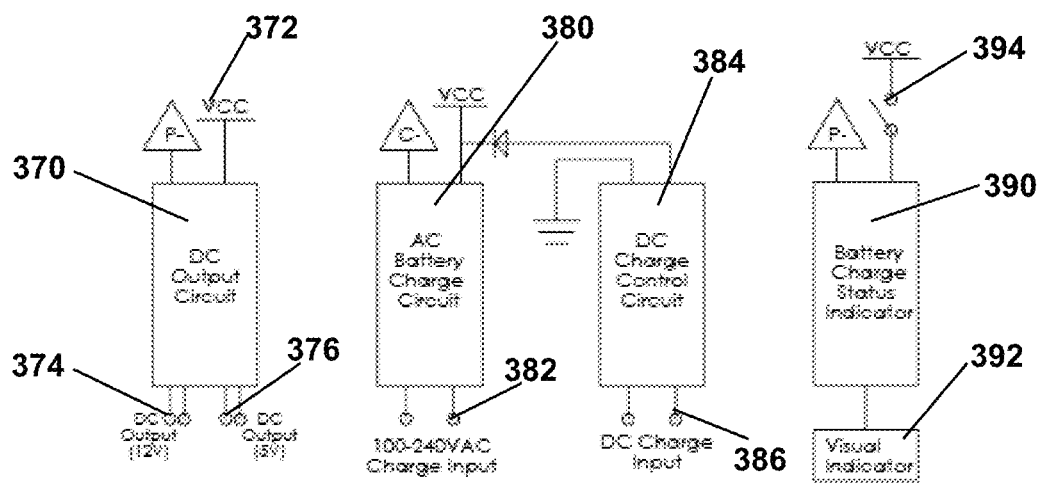

FIG. 4C shows a DC output circuit in accordance with the power system. The DC output circuit 370 is connected to a battery Vcc 372. The DC output circuit 370 can be coupled with multiple DC outlets, such as a 12V DC output 374 and a 5V DC output. The DC charge control circuit facilitates DC charging from several sources simultaneously, provides reverse-polarity protection to DC charging sources, limits input current, and disconnects DC charging sources when battery is fully charged. The DC charge control circuit maximizes the use of available DC (alternative energy) when simultaneously charging with AC power.

Details of the power system adapted to accept an AC and/or DC charge including an AC battery charge circuit and a DC charge control circuit are illustrated in FIG. 4D. The AC battery charge circuit 380 is connected to an AC charge input 382, such as a 100-240 VAC charge input. The DC charge control input 384 is connected to a DC charge input 386. The AC battery charge circuit 380 and the DC charge control circuit 386 are connected to the battery in the power system. The AC and DC charge can be used to charge the power system using one source or both AC and DC sources. The AC to DC charging circuit converts an AC power source (user plugs into a AC mains power source) to the corresponding DC voltage for battery charging. The AC to DC charging circuit utilizes a transformer for galvanic isolation. The output of the charging circuit is optimized for the specific battery chemistry to provide efficient charging and to maximize battery life.

FIG. 4E shows a battery charge status indicator 390 and visual indicator 392 in a power system. The battery charge status indicator 390 is connected to the visual indicator 392 to provide the user of the power system a visual gauge to determine the charge level of the power system. The battery charge status indicator 390 is coupled to the power source with a switch 394. When the switch 394 connects the battery charge status indicator 390 to the power source, the visual indicator 392 lights up a corresponding amount of lights to show the charge status. The battery charge status indicator 390 gives the user an approximate indication of the battery charge state and is located on the user interface for easy access.

Figure 5:
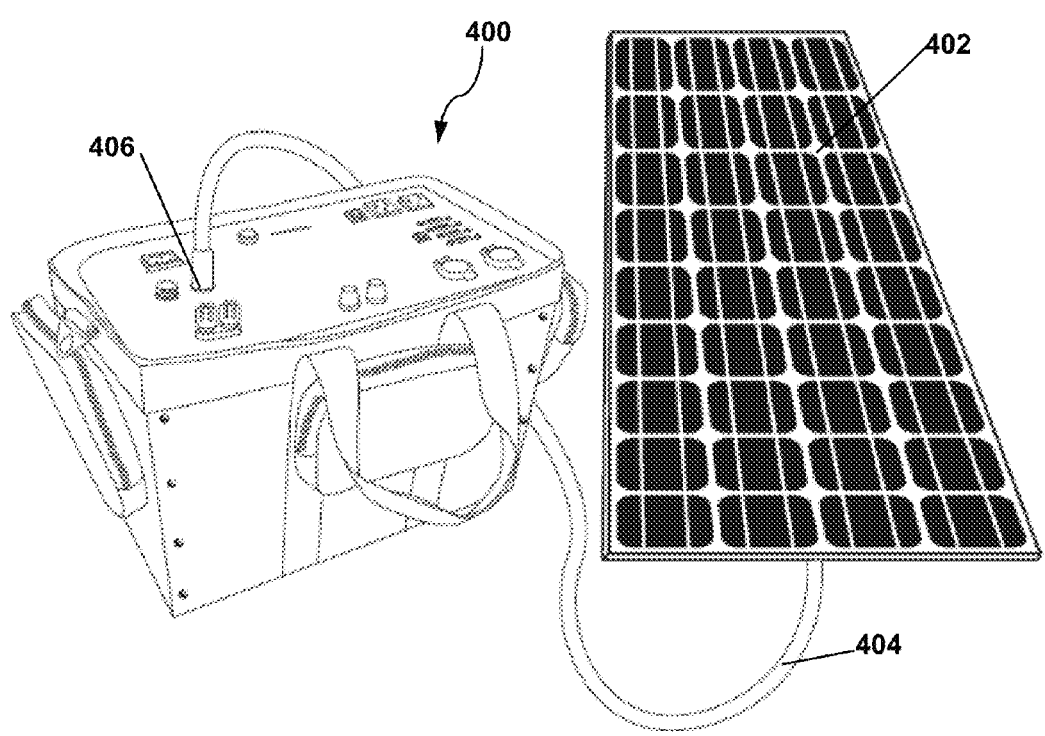
FIG. 5 illustrates a DC charging source connected to the power system.

FIGS. 5-10 illustrate a power system 400 connected to a variety of charging sources and/or output devices. In FIG. 5, the power system 400 is connected to a solar panel 402. The solar panel 402 includes a cable 404 that connects the panel to a DC charge input 406. The solar panel 402 converts solar energy into energy to charge the battery in the power system 400.

Figure 6:
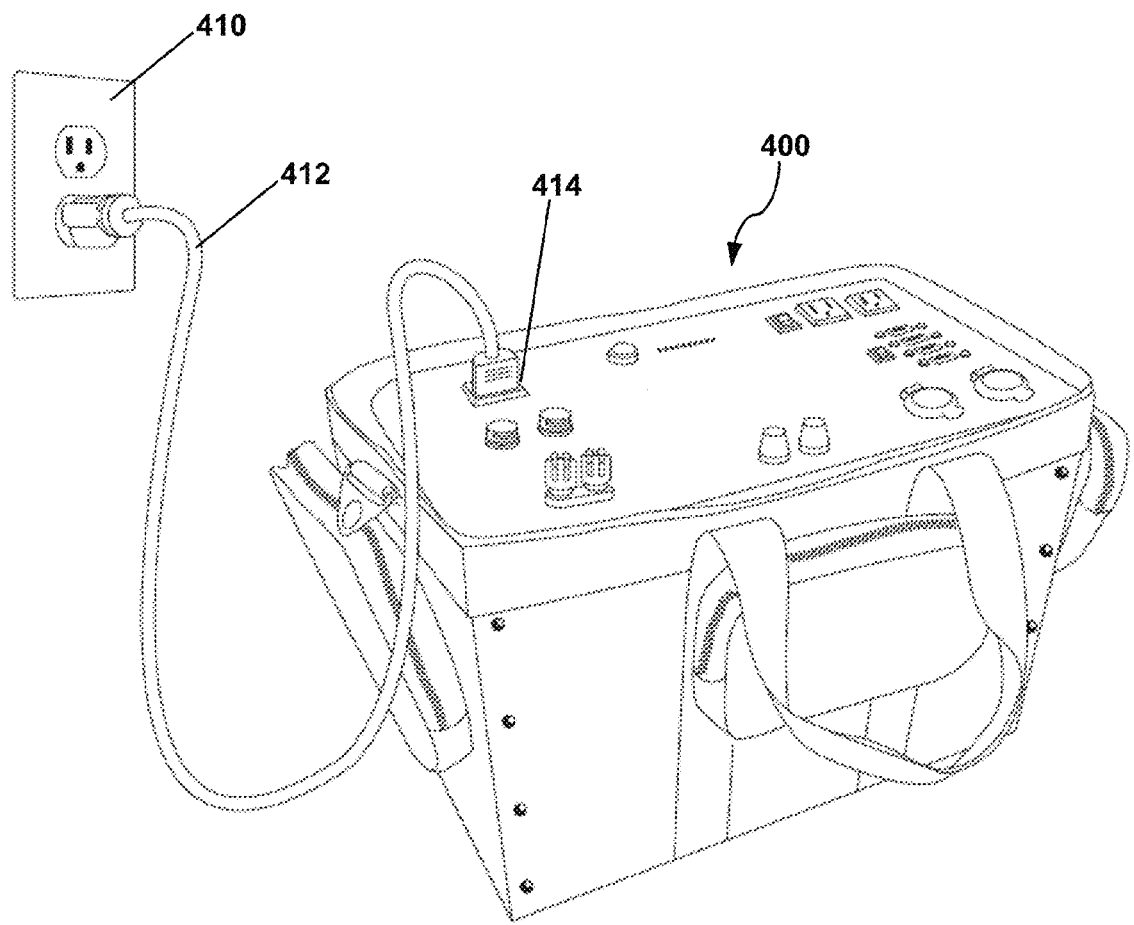
FIG. 6 illustrates the power system connected to an AC charging source.

FIG. 6 shows the power system 400 being charged by an AC power source. The power system 400 is connected to a wall outlet 410 using an AC power cord 412. The power cord 412 is connected to an AC charge input 414 on the power system 400. The other end of the cord is plugged into the wall outlet 410. Electricity from the wall outlet 410 is used to charge the battery in the power system 400.

Figure 7:
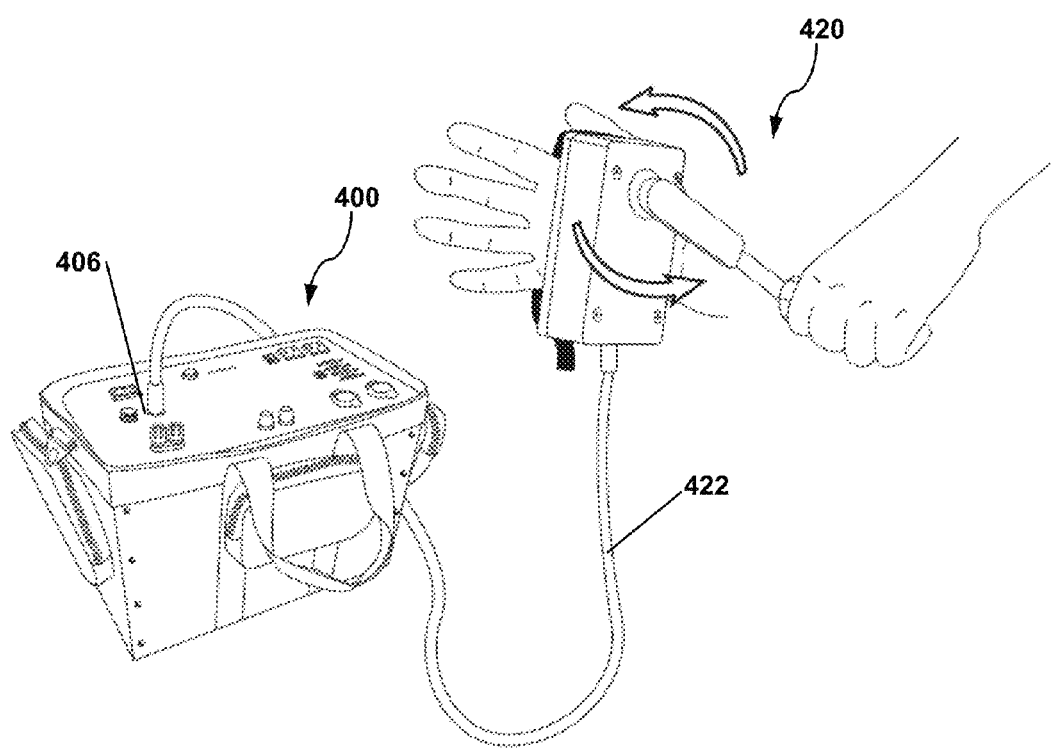
FIG. 7 illustrates the power system connected to a DC charging source.

In FIG. 7, a hand crank generator 420 is used to charge the power system 400. A cable 422 connects the hand crank generator 420 to the power system 400. The cable 422 is connected to the DC charge input 406 on the power system 400. The user winds the hand crank generator 420 to generate electricity and charger the battery in the power system 400.

Figure 8:
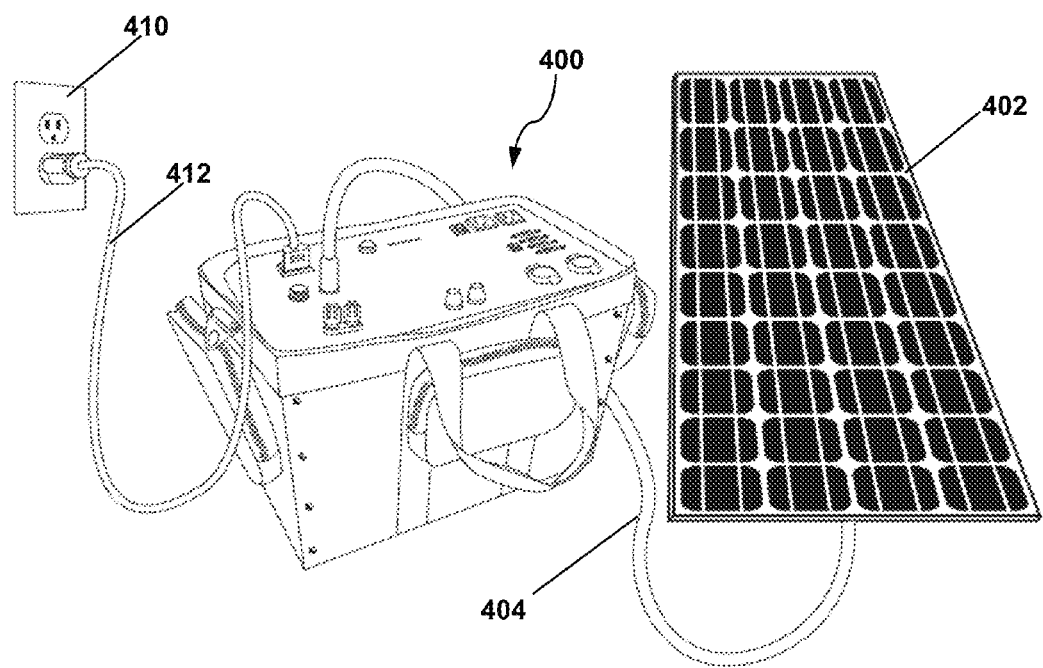
FIG. 8 illustrates the power system connected to AC and DC charging sources.

Multiple sources can be used to charge the power system 400, as shown in FIG. 8. The solar panel 402 is connected to the power system 400 with cable 404 as discussed above with respect to FIG. 5. The power system 400 is also being charged at the same time using the wall outlet 410. The power system 400 is connected to the wall outlet 410 using the AC power cord 412 as discussed above with respect to FIG. 6. The power system 400 is configured to accept the charge from the AC source at the same time as the DC source.

Figure 9:
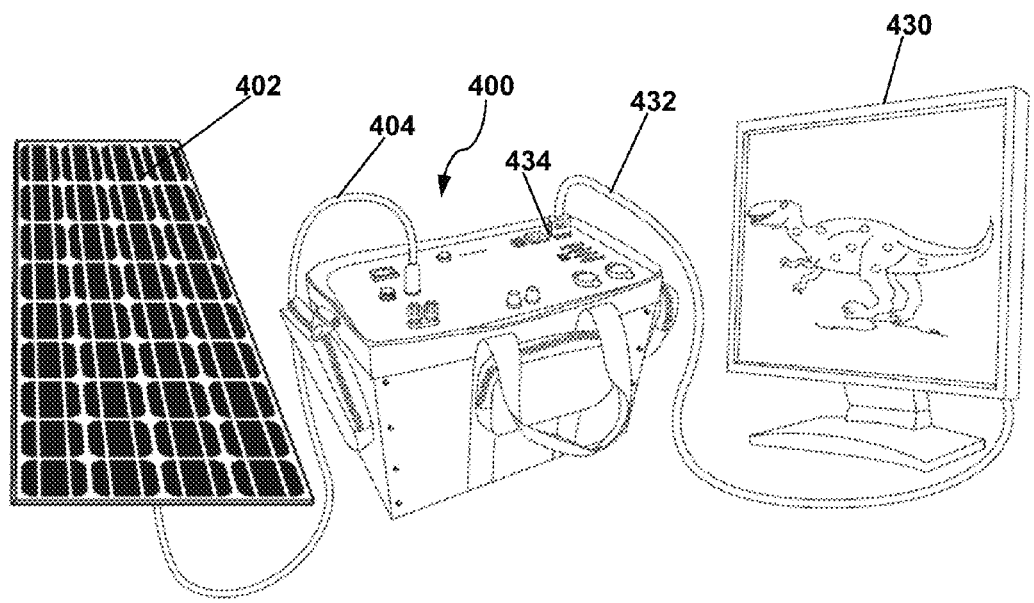
FIG. 9 illustrates the power system connected to a DC charging source and an AC device.

In FIG. 9, the power system 400 is connected to a charging source and, at the same time, powering up a device. The solar panel 402, for example, can be used to charge the power system 400 by connecting the panel up to the system using cable 404. At the same time, a device 430, such as a flat panel display, can be connected to the power system 400 using a cable 432. The device 430 draws AC power from the system, by connecting the cable 432 to a 120 VAC outlet 434 on the power system 400. Any AC device that is compatible with the system can be used at the same time the system is being charged.

Figure 10:
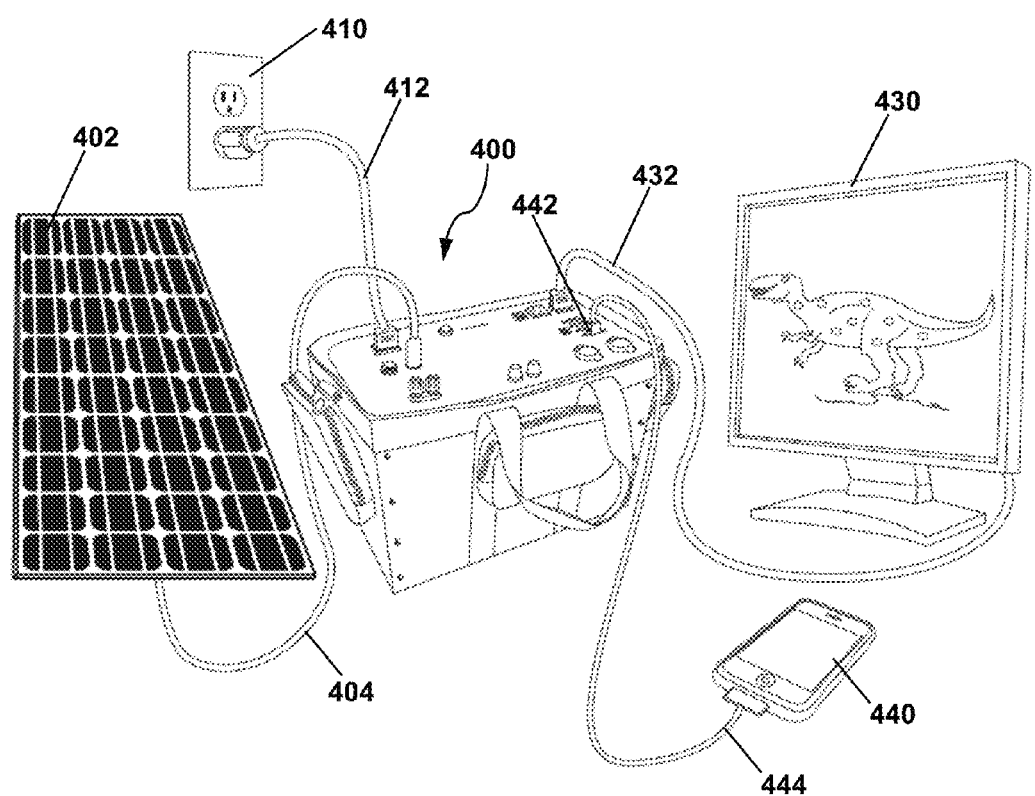
FIG. 10 illustrates the power system connected to AC and DC charging sources and AC and DC devices.

FIG. 10 illustrates the power system 400 being charged by multiple sources, including both AC and DC sources, and being used as a power source for both AC and DC devices. The solar panel 402 is connected to the system using cable 404. The power system 400 is also connected to a wall outlet 410 using a power cord 412. A device 430 is connected to the system using cable 432. Another device 440, such as a smart phone or MP3 player, is connected to the system at a USB outlet 442 using a cord 444. The power system 400 can be charged by a DC power source, such as solar panel 402, and by an AC power source, such as a wall outlet 410. While being charged, the system can also be used as a power source for AC devices, such as a flat panel display 430, and DC devices, such as a smart phone 440.

To charge the power system from an AC wall outlet, the user plugs the AC charging cord into an AC outlet connector on the control panel and then plugs the cord into the wall outlet. An AC charge LED lights up red while charging and turns green when charge is complete. When complete, the user unplugs the charging cord.

To charge the system from a DC charging source, the user connects red (+12) and black (−12) wires from a DC charging source to the red and black sides of the DC charge input by unscrewing the red and black terminals, and inserting the wires into the holes on the terminal posts. The terminals should be tightened snugly. If the charging accessory has an aviation connector, for example, the user can plug the connector into either of the DC charge sockets and tighten the locking ring snugly. The DC charge input LED lights up red when charging. When a solar panel is connected as the charging source, no solar charge controller is needed. The DC charge connectors or sockets can be rated, for example, MAX 100 W solar panel per socket.

The power system is compatible with a large range of appliances and electronic devices. When using the AC power connectors, the user should turn the switch next to the AC connector or outlet to the "on" position. The inverter inside the power system may take a few seconds to power up. A green LED above the switch will light up when the system is ready. The user can plug in an appliance or electronic device into the AC outlet in a similar manner as one would use a regular wall outlet.

A fault can be indicated by the output power of the AC outlet switching to an "off" position, and a red LED lighting up. A fault indicates a short in the appliance, power overload, or low battery. To reset the fault, the user can switch the AC outlet switch to an "off" position and then switch it back to the "on" position.

When using the USB outlets or connectors, the user plugs in one or more devices and switches the power switch to an "on" position. The user can switch off the power switch when the system is not in use. Some outlets can be designated to provide up to 2.1 A each. Other USB outlets can be designated to provide up to 1.0 A each. The devices should be plugged into the corresponding USB outlet.

To use a 12 VDC outlet, the user can flip open a protective outlet cover, and plug in a device. The 12 VDC outlet is in the "on" position. When done powering the device, the user should unplug the device and close the outlet protective cover. Each socket can be rated for up to 10 A each.

The battery can include a single battery pack composed of single cells in series, or a pack assembled from multiple cells assembled in different series or parallel configurations to determine the desired DC system voltage and battery capacity. The battery control module protects the battery from damage due to over-discharging (low voltage disconnect), over charging, and/or balances the cells during charging and/or provides an over-temperature means of disconnecting the battery from the charging and discharging circuits. The battery protection module can prevent hazardous battery conditions and to maximize or extend the battery life.

The power system 10 is a versatile portable stand-alone energy system that can be charged with a variety of methods, store power for an extended period of time, and provide power in several different forms. The system can be charged from a range of AC sources and multiple DC sources simultaneously, in any combination. This capability is due to the configuration of the battery, AC charging circuitry, battery control module and diodes. The diodes between the DC charging inputs and AC charging circuitry enable AC charging and DC charging to occur simultaneously without affecting the DC charging inputs. In addition to allowing AC and DC charging simultaneously, the diodes between each of the DC inputs allow the user to charge the system from multiple non-identical DC sources simultaneously. The user, for instance, can charge the battery from a 100 W solar panel and a 35 W manual generator simultaneously. Further, the configuration of the charging components allows for charge source self-optimization between DC and AC charging sources and isolates charging sources from each other. The system provides immediately available power for emergencies or general use and/or a complete system for easily utilizing alternative energy and providing continuous and/or stand-by power for any application where AC power or DC power has failed, or is otherwise unavailable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power system, comprising:
   an electric battery;
   an enclosure configured to surround the electric battery;
   a console disposed on at least one side of the enclosure, the console including:
   a first charge input configured to receive a charge from an AC power source to charge the electric battery,
   a second charge input configured to receive a charge from a DC power source to charge the electric battery, and
   an outlet configured to receive a connector for a device; and
   a battery management system including controls to regulate a simultaneous battery charge between the first charge input and the second charge input to charge the electric battery and to provide power in the form of AC and DC from the electric battery.

2. The power system according to claim 1, wherein the outlet is at least one of a set of USB outlets, a set of VDC outlets, and a set of VAC outlets.

3. The power system according to claim 2, wherein the outlet is a set of USB outlets and the console further comprises a toggle switch.

4. The power system according to claim 3, wherein the console further comprises an indicator light coupled with the set of USB outlets to indicate proper power to the set of USB outlets.

5. The power system according to claim 2, wherein the outlet is a set of VAC outlets and the console further includes a toggle switch.

6. The power system according to claim 5, wherein the console further comprises a set of indicator lights coupled with the set of VAC outlets to indicate proper power to the set of VAC outlets.

7. The power system according to claim 1, wherein the first charge input is a set of AC charge connectors.

8. The power system according to claim 1, wherein the first charge input is a set of DC charge connectors.

9. The power system according to claim 1, further comprising a carrying bag configured to enclose at least a portion of the power system.

10. The power system according to claim 9, further comprising at least one pouch attached to the carrying bag.

11. A power system, comprising:
    an electric battery;
    an enclosure configured to surround the electric battery;
    a console disposed on at least one side of the enclosure, the console including:
    a first charge input configured to receive a charge from an AC power source,
    a second charge input configured to receive a charge from a DC power source, and
    an outlet configured to receive a connector for a device; and
    a battery management system including controls to allow a battery charge from the first charge input and the second charge input simultaneously to charge the electric battery, and to simultaneously provide power in the form of AC and DC from the electric battery.

12. The power system according to claim 11, further including diodes in circuitry of the battery management system, the diodes disposed between the first charge input and the second charge input.

13. The power system according to claim 12, wherein the battery management system is configured for charge source self-optimization between the first and second charge inputs.

14. The power system according to claim 12, wherein the battery management system is configured to isolate the first and second charge inputs from each other.

15. A power system, comprising:
    an electric battery;
    an enclosure configured to surround the electric battery;
    a console disposed on at least one side of the enclosure, the console including:
    a first charge input configured to receive a charge from an AC power source,
    a second charge input configured to receive a charge from a DC power source, and
    an outlet configured to receive a connector for a device;
    a master isolation switch connected to the battery, the master isolation switch positioned to disconnect the first charge and the second charge inputs and the outlet from the battery; and
    a battery management system including controls to allow a battery charge from the first charge input and the second charge input and simultaneously provide power in the form of AC and DC from the electric battery.

16. The power system according to claim 15, further comprising a battery management system including controls to allow a battery charge from the first charge input and the second charge input simultaneously.

17. The power system according to claim 16, wherein the master isolation switch disables the battery management system.

18. The power system according to claim 16, wherein battery management system includes controls to regulate a battery charge between the first charge input and the second charge input.

19. The power system according to claim 16, further including diodes in circuitry of the battery management system, the diodes disposed between the first charge input and the second charge input.

20. The power system according to claim 16, wherein the battery management system is configured for charge source self-optimization between the first and second charge inputs.

* * * * *